United States Patent [19]
Krasicky, Jr.

[11] Patent Number: 5,632,891
[45] Date of Patent: May 27, 1997

[54] SELF VENTING SEPTUMS FOR USE IN A LIQUID FILTRATION SYSTEM

[75] Inventor: Stephen Krasicky, Jr., Greensboro, N.C.

[73] Assignee: Purolator Products Company, Tulsa, Okla.

[21] Appl. No.: 559,228

[22] Filed: Nov. 17, 1995

[51] Int. Cl.⁶ .................... B01D 29/15
[52] U.S. Cl. ............ 210/193; 210/323.2; 210/333.01; 210/436; 210/472; 210/489; 210/497.01
[58] Field of Search .............. 210/193, 323.2, 210/333.01, 436, 472, 489, 497.01

[56] References Cited

U.S. PATENT DOCUMENTS

| | | | |
|---|---|---|---|
| 3,373,104 | 3/1968 | Ryan . | |
| 3,666,097 | 5/1972 | Ryan . | |
| 3,680,700 | 8/1972 | Ryan . | |
| 3,779,386 | 12/1973 | Ryan | 210/193 |
| 4,267,039 | 5/1981 | Ryan | 210/767 |
| 4,293,414 | 10/1981 | Gianneli | 210/193 |
| 4,405,466 | 9/1983 | Giannelli et al. | 210/798 |
| 4,526,688 | 7/1985 | Schmidt, Jr. et al. | 210/332 |
| 4,904,380 | 2/1990 | Bhanot et al. | 210/193 |
| 4,973,404 | 11/1990 | Weber et al. | 210/193 |
| 5,017,241 | 5/1991 | Ryan | 210/333.01 |
| 5,399,265 | 3/1995 | Nehls | 210/490 |

*Primary Examiner*—W. L. Walker
*Attorney, Agent, or Firm*—Joseph V. Tassone

[57] ABSTRACT

A septum adapted to be pre-coated with a filter and/or chemical treatment composition is formed of a tubular core member having a top and a bottom end. A plurality of top openings is provided in the core member immediately adjacent to the top end. A short actual length portion of the tubular core is impervious adjacent to the plurality of the top opening. The balance, extending for the major portion of the length of the tubular core is perforated. A multi-layer filter screen is positioned about the exterior of the tubular core. A tubular air release shield is positioned on the filter screen having a length to substantially extend from the tubular core top to cover the top openings in the tubular core and the tubular core impervious portion. A vent opening is provided in the air release shield. An end fitting closes the top end of the tubular core. Air entrapped within the septum is vented through the tubular core top openings and the air release shield to prevent air entrapment within the septum and to augment more effective precoating of the septum.

12 Claims, 3 Drawing Sheets

SELF VENTING SEPTUMS FOR USE IN A LIQUID FILTRATION SYSTEM

CROSS-REFERENCE TO RELATED APPLICATIONS

This application is not related to any pending patent application.

CROSS-REFERENCE TO MICROFICHE APPENDIX

This application is not related to any microfiche appendix.

BACKGROUND OF THE INVENTION

The present invention relates to a self venting septum for use in a liquid filtration system. By "septum" it is meant a filter cartridge of a generally tubular configuration having a cylindrical filtration screen thereon through which liquid passes from the exterior to the interior. The invention is particularly concerned with a septum having means for self venting whereby air trapped within the septum as a vessel in which the septum is located is filled with liquid can vent to the exterior. The ability of the septum to self vent expose substantially the entire vertical length of the septum to the flow of liquids therethrough. This is particularly important during the process of pre-coating the septum filtration screens with a medium to augment separation effectiveness.

A well known means of effectively purifying liquids is by passing them through filter screens which have been pre-coated with a layer of filter enhancing material, such as, ion exchange resin particles or other pre-coat medium which may include also diatomaceous earth. In the typical system, a plurality of septums are spaced within a filter tank. The filter tank includes an upper influent compartment and a lower filtrate compartment separated by a generally horizontal divider. The septums or filtration cartridges are vertically supported to the divider plate and extend upwardly within the influent compartment. Each septum includes a cylindrical perforated core element. Covering the perforated core is a filtration screen. The screen is usually of multi-layers with a core screen adjacent to the perforated tubular core member and with at least one finer mesh screen on the outside of the core screen.

To increase the filtration effectiveness a standard procedure is to pre-coat the filter cartridge using a water slurry of pre-coat medium. To do this the water slurry having the pre-coat medium is passed into the tank influent compartment. As the water, having the pre-coat medium suspended therein, enters the influent compartment the level rises and begins to infiltrate the septums, that is, to pass through the fine mesh screens on the exterior of the septums. As the water level rises on the exterior of the septums it also rises on the interior but at a slower rate because of the bubble point pressure of the wetted septum surfaces. This filling procedure, wherein water is added until it extends over the top of the septums can result in air being trapped within the septums. If air is trapped and not released, no water flows through the upper portion of the septums because of the trapped air therein. During fill of the vessel influent compartment, air entrapped in the septum is being forced out by the incoming water and is conversely being resisted to flow out as a result of the bubble point pressure of the wetted septum surface. Thus an equilibrium pressure is formed in which the driving force for the air to flow out of the septum is equalized by the bubble point pressure of the wetted septum. The bubble point of various types of filter medium is frequently expressed in terms of inches of water column pressure necessary to force the first bubble of air through the wetted medium surface. For example, if the septum is made from media with a bubble point pressure of two inch water column, then it follows that when an equilibrium is reached there will remain a two inch air space in the top of each septum. This is significant since the pre-coat material is intended to form a uniform pre-coat on the entire septum surface. A uniform pre-coat however cannot be established at the top two inches of each septum since this space is filled with air.

When the pre-coating is completed, the vessel is closed off and pressurized, thereby decreasing the volume of air in the top of each septum, due to compressibility of the air, and during operation a portion of the top 2 inches of each septum will allow raw untreated water to flow through the septum without flowing through the pre-coat, such as without flowing through an ionic exchange media. The result is untreated water entering into the vessel lower filtrate compartment.

Others have attacked this problem and for background information relating to this disclosure, U.S. Pat. Nos. 3,680,700 that issued Aug. 1, 1972 entitled "Method of Pre-coating Filter Cartridges", and U.S. Pat. No. 3,779,386 that issued Dec. 18, 1973 entitled "Filter Cartridge" are helpful. U.S. Pat. No. 4,293,414 that issued on Oct. 6, 1981 and entitled "Slotted Sheet Filter Element" shows a cylindrical filter element having a function similar to the apparatus of the present disclosure but employs a discontinuously slotted sheet in which each of the slots have a particle retention capability less than about 50 microns. These three issued patents are incorporated herein by reference as each discloses and describes in substantial detail the employment of filtration systems including vessels having a plate dividing the interior into an upper influent compartment and a lower filtrate compartment and in which a plurality of spaced apart vertical cylindrical septums are employed for filtration. Further, these patents disclose the concept of pre-coating the septums for enhanced filtration and/or water treatment action.

For further background information relating to the subject of this disclosure, see the following United States patents:

| U.S. Pat. No. | INVENTOR | TITLE |
| --- | --- | --- |
| 3373104 | Ryan | Method of Cleaning Filter Tank |
| 3666097 | Ryan | Method and Apparatus For Cleaning A Filter Cartridge |
| 4267039 | Ryan | Fluid Filtration Method and Apparatus |
| 4405466 | Giannelli et al | Backwash Method and Apparatus |
| 4904380 | Bhanot et al | Precoat Filter Assembly |
| 4973404 | Weber et al | Micro/Ultra Filtration System |
| 5399265 | Nehis | Filter Septum |

BRIEF SUMMARY OF THE INVENTION

This invention provides a septum for use in a filtration system, the filtration system having a filter tank, a plate separating the tank into an upper influent compartment and a lower filtrate compartment. A plurality of spaced apart vertically supported septums are mounted in the influent compartment. The filtration system includes means for pre-coating the septums with a pre-coat material which can be ionic exchange resin, diatomaceous earth, or so forth.

Each of the septums includes a tubular core member having a top end and a bottom end. A plurality of top openings are provided in the tubular core immediately below the top end. Below the top openings there is a short axial length of the core that is impervious, that is, it does not have any openings through it. Below the short length impervious portion is a perforated portion that extends downwardly to the tubular core member bottom end. The majority of the axial length of the tubular core members is thus perforated.

Positioned about the exterior of the tubular core is a multi-layer filter screen. In the typical arrangement the filter screen is formed of two or more layers, the layers differing in mesh. In a typical embodiment a filter screen may have a 60×60 inner mesh, an intermediate 50×250 mesh and an outer 58×58 mesh. This is strictly by way of example only as the arrangement of the filtration screen vary considerably not only in the number of layers of screen employed but in the selected mesh. An ideal arrangement for the multi-layer filter screen employs the use of a product available from Facet Filter Products division of Purolator Products Company located in Greensboro, N.C. and sold under the trademark POROPLATE.

A tubular air release shield is positioned on the filter screen. The air release shield has a tubular sidewall with at least one opening therethrough. The side wall extends from the tubular core member top for a short length in a direction towards the tubular core member bottom. The length of the air release shield is preferably that which at least substantially encompasses the tubular core member impervious portion and thus encompasses the top openings formed in the tubular core.

An end fitting is provided for closing the top end of the tubular core as well as the top end of the air release shield.

This arrangement provides a means for self venting air that may be entrapped in the septum during a pre-coating operation in which the filtration system vessel is filled with water carrying a pre-coat material. As the water level in the vessel rises, air entrappeal in the septum is vented through the tubular core top openings and through the opening in the air release shield.

In a preferred arrangement the filter screen is provided with a mesh configuration that is coarser in the area that covers the tubular core member top openings. Another embodiment of the invention employs an inverted downwardly extending conical portion formed as a part of the end fitting which closes the top of the tubular core. This downwardly extending conical portion forces air entrapped within the septum to migrate to the top openings in the tubular core so that it is more expeditiously vented from the septum.

A more complete understanding of the invention will be obtained from the following description of the preferred embodiments taken in conjunction with the attached drawings.

DESCRIPTION OF THE PREFERRED EMBODIMENTS

Figure 1:
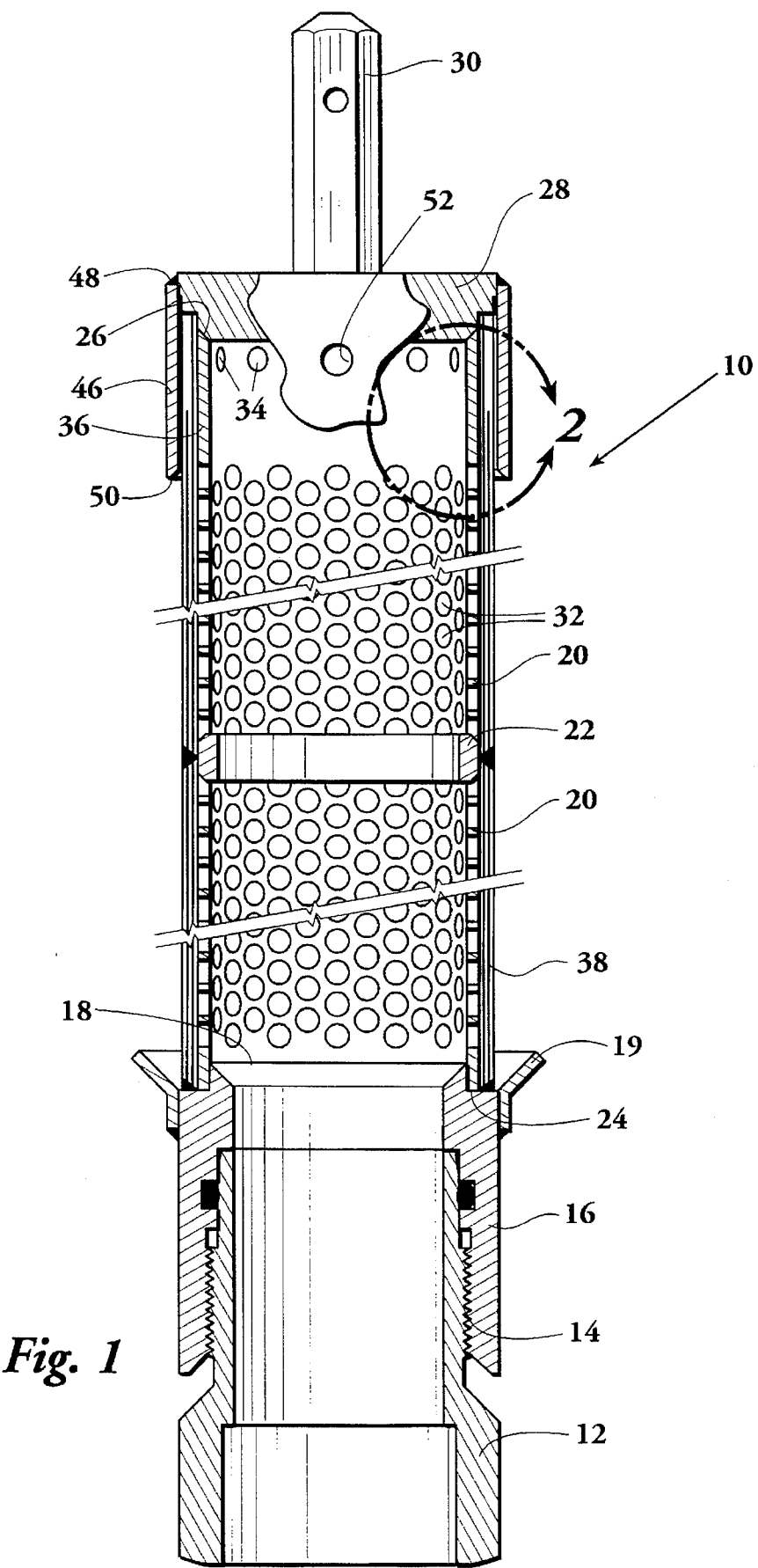
FIG. 1 is an elevational cross-sectional view, broken away, of a tubular septum for use in a filtration vessel. The septum of FIG. 1 shows an improved means of venting air from the interior of the septum as the filtration vessel is filled with water during the usual pre-coat operation.

FIG. 1 is an elevational cross-sectional view of a septum employing the principles of this invention. The septum, generally indicated by the numeral 10, is a tubular filtration device of the type employed in a filtration system, such system consist of a vessel (not shown) having a generally horizontal plate dividing the vessel interior into an upper influent compartment and a lower filtrate compartment. A plurality of upright septums are supported by the horizontal plate. For background information as to systems and types of vessels in which septum 10 is employed, reference may be had to U.S. Pat. Nos. 3,680,700; 3,779,386 and 4,293,414 which are incorporated herein by reference.

Septum 10 is supported on an adapter 12 that is secured to the generally horizontal plate in a filtration vessel (not seen), the adapter interior communicating with the vessel lower filtrate section and the adapter extending upwardly into the vessel influent section. Adapter 12 has external threads 14 that threadably receives an open end cap 16 which forms the lower portion of septum 10. End cap 16 provides means whereby the septum can be mounted within or removed from the interior of a vessel by threading it onto or unthreading it from adapter 12. Open end cap 16 has an upper end 18. Affixed to the exterior of the upper end of end cap 16 is a circumferential flare 19.

Supported to the end cap 16, in axial alignment, is a tubular core 20. In the illustrated arrangement the tubular core is formed of two axial lengths joined by a center fitting 22. Tubular core 20 has a lower end 24 and a top end 26. Closing tubular core top end 26 is an end cap 28 having an upwardly extending hexagonal shaft 30 that is used for installing or removing a septum from the interior of a filtration vessel.

Tubular core 20 is perforated throughout substantially its entire length, the perforations being indicated by the numeral 32. The arrangement of perforations adjacent core top end 26 is an important aspect of this invention. A plurality of top openings 34 are formed in the tubular core immediately below the top end 26. Below the top openings 34 there is a short axial length impervious core portion 36. Below the impervious core portion 36 the tubular core is perforated to substantially the lower end 24.

Figure 2:
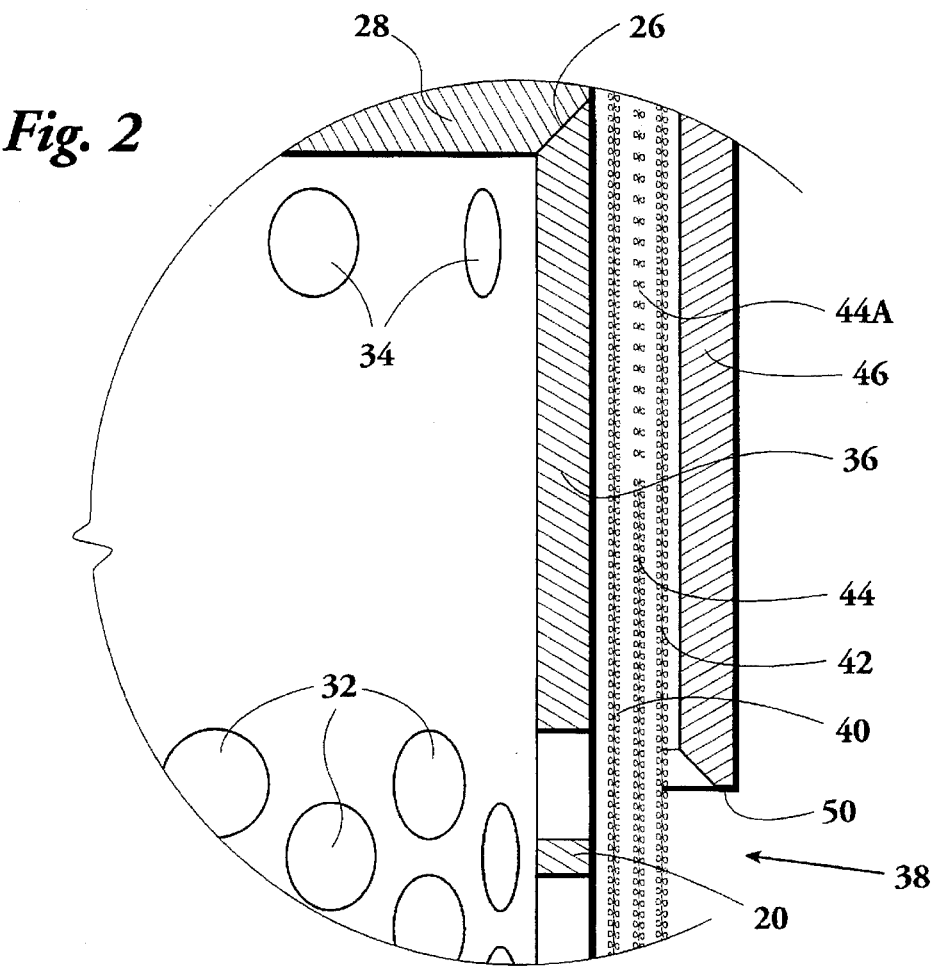
FIG. 2 is an enlarged view of the upper portion of FIG. 1 showing the relationship between the upper end of the perforated core, the filtration screen and the air release shield, illustrating the means whereby air is released as the vessel, in which the septum is positioned, is filled with water.
Figure 3:
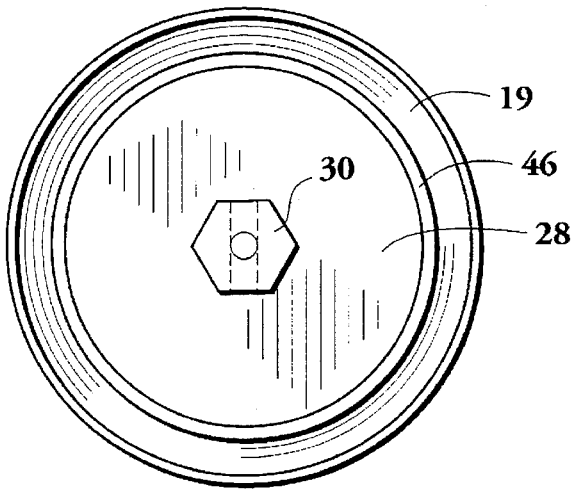
FIG. 3 is a top plan view of the septum of FIG. 1.
Figure 4:
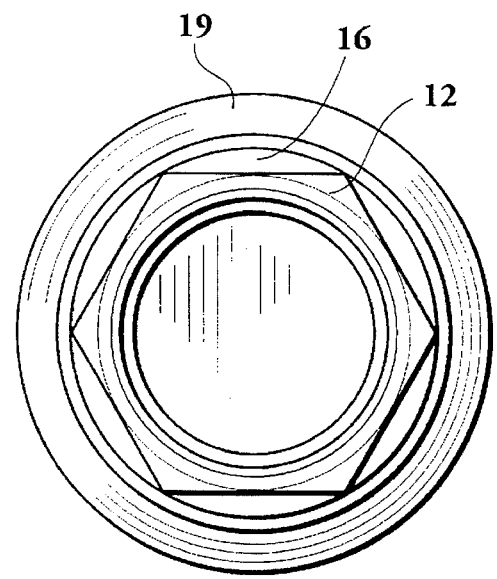
FIG. 4 is a bottom view of the septum of FIG. 1.

Surrounding tubular core 20 is a multi-layer screen 38. As best seen in FIG. 2, screen 38 is preferably formed of three layers, that is, an inner layer 40, an outer layer 42, and a middle layer 44. In the typical arrangement the inner and outer layers 40 and 42 are of a coarser mesh while the middle layer 44 is of a fine mesh. As an example, inner layer 40 and outer layer 42 may each be of 60×60 mesh, while the middle layer 44 may be of 50×250 mesh. Thus, the middle layer essentially defines the degree of filtration of the septum, that is, the fine mesh of middle layer 44 determines the maximum particle size that can penetrate the septum. This maximum particle size however is further determined by the imposition of a coating (not seen) on the exterior of the filter screen 38.

When a filtration vessel is initially put into service or when new septums have been installed, before actual use of the vessel for filtration purposes, it is treated to apply a layer of filtration enhancement material (not shown) on the exterior of the screen. This is accomplished by filling the influent or upper section of the vessel with water in which is suspended in the coating medium. The coating medium may be such as diatomaceous earth, particularly if the only function of the filtration vessel is to filter out solid particles, or the filter enhancement medium may be such as ion exchange resin if a function of a filtration vessel is water purification in addition to filtration. During the treatment process as water having the suspended treatment material therein rises within the influent section of the vessel, the water level rises on the exterior of the septum. As water rises on the septum it passes through the septum and in the process deposits the suspended filtrate material on the exterior of screen 38. Due to the inherent bubble point pressure of the wetted multi-layer screen, an equilibrium pressure is reached between the interior and exterior of the septum so that the water level exterior of the septum is higher than the water level within the septum, that is, air is entrapped within the interior of the septum. As water carrying the filtration enhancement material fills the vessel and passes over the top of end cap 28, entrapped air prohibits the passage of water carrying the filtration enhancement material with it into the septum upper portion. Thus, the upper portion of the septum is untreated. To overcome this problem, the upper end portion of the septum is especially designed as illustrated to include top openings 34 and core impervious portion 36 combined with a tubular air release shield 46.

Air release shield 46 is of short axial length and has an interior diameter to closely fit on the exterior of screen 36. Top end 48 of air release shield 46 is secured to end cap 28; the bottom end 50 of end cap 46 is open. The end cap is impervious except for an air outlet opening 52 in the tubular wall. The outlet opening 52 is preferably approximately elevationally coincident with tubular core top openings 34.

To further augment the passage of air out of the interior of the septum, the middle layer 44 of screen 38 is preferably of enlarged mesh in the area surrounding top openings 34. As illustrated in FIG. 2, the uppermost portion 44A of middle screen 44 is of coarser mesh. For example, when middle screen 44 is of 50×250 mesh as previously mentioned, the upper portion 44A may be of 100×100 mesh. This upper, reduced mesh portion is on the exterior of tubular core 20 that includes the impervious portion 36 and is exterior of top openings 34.

The combination of a tubular core having an impervious portion adjacent the top with a plurality of top openings immediately below end cap 26, surrounded by air release shield 46 with a single opening 52 therein combined with the employment of a coarser middle screen 44A provides a system for venting the interior of the septum to permit the escape of entrappeal air and to thereby more fully and effectively treat the exterior of the septum with a filtration enhancement material.

Figure 5:
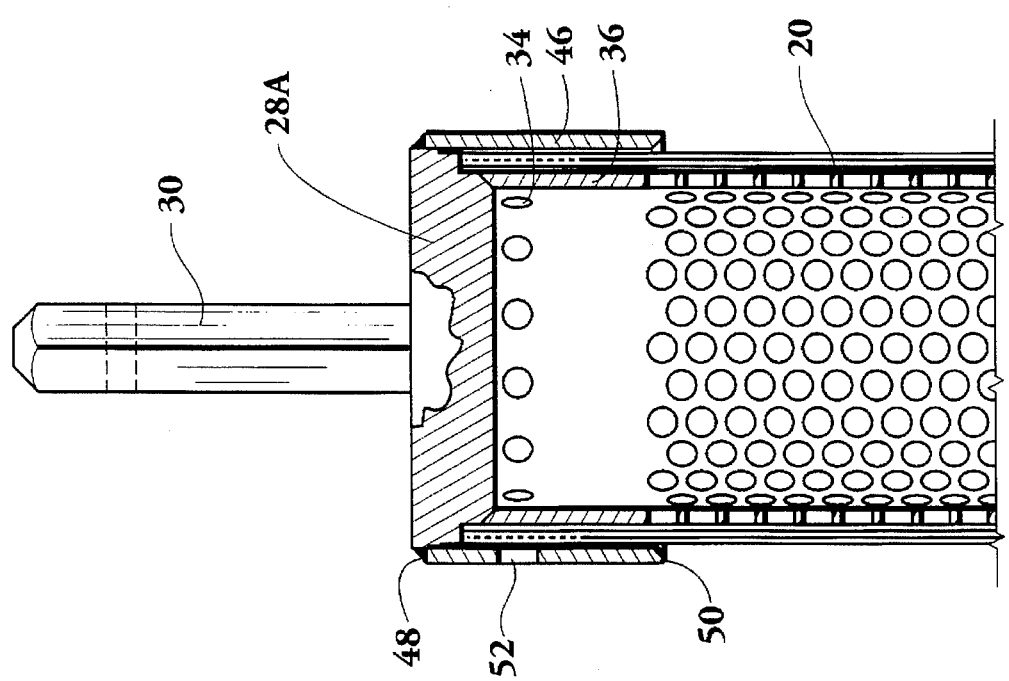
FIG. 5 is an elevational cross-sectional partial view of the upper end portion of the septum of FIG. 1 wherein the septum has been rotated 90°.

FIG. 5 shows the upper portion of the septum of FIG. 1 rotated 90° to show the relationship between opening 50 in air release shield 46 relative to the top openings 34 in the tubular core.

Figure 6:
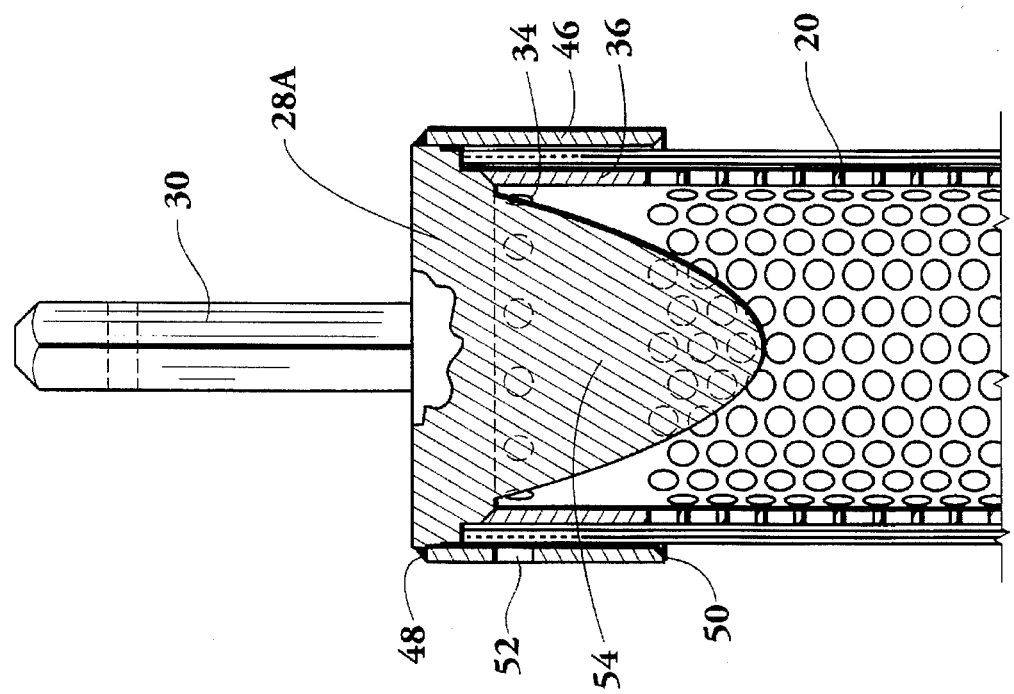
FIG. 6 is the upper portion of a septum according to this invention including an alternate embodiment of the end fitting. In this embodiment the end fitting has an integral conical portion that functions to cause air entrapped within the septum to migrate to the upper circumferential interior of the perforated core for more expeditious passage out of the interior of the septum.

FIG. 6 shows an alternate embodiment in which the end cap 28A has an integral downwardly extending conical portion 54. This arrangement causes air that is entrapped within the interior of the septum to be forced towards the area adjacent top openings 34. In this way the air is channeled towards the top openings to more effectively and efficiently vent the air from the interior of the septum.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A septum adapted to be pre-coated with a filter and/or chemical treatment composition comprising:

a tubular core member having a top end and a bottom end, having a plurality of top openings therein immediately adjacent said top end, having a short axial length impervious portion adjacent said plurality of top openings and a perforated portion from said impervious portion to said bottom end;

a multi-layer filter screen positioned about the exterior of said tubular core;

a tubular air release shield positioned on said filter screen having a tubular sidewall with at least one opening therethrough, the sidewall extending from said tubular core top towards said tubular core bottom of a length sufficient to at least substantially encompass said tubular core impervious portion; and an end fitting closing said top end of said tubular core whereby at least a substantial portion of gas entrapped in the septum is vented through said tubular core top openings and said air release shield at least one opening.

2. A septum according to claim 1 wherein said multi-layer filter screen has a short axial length upper screen portion and a lower screen portion, the upper filter screen portion being formed of more open mesh material and the lower filter screen portion being formed by more closed mesh material.

3. A septum according to claim 2 wherein a point of transition is established between said more open mesh material and said more closed mesh material, the point of transition being within said tubular air release shield.

4. A septum according to claim 2 wherein said filter screen is formed of at least two layers having different meshes and wherein one screen has substantially the same mesh from said top to said bottom of said tubular core and another screen has a more open mesh in said upper screen portion and a more closed mesh in said lower screen portion.

5. A septum according to claim 1 wherein said end fitting has a substantially inverted conical inner surface downwardly extending within said tubular core top end configured to cause any air trapped within said tubular core to move towards said top openings.

6. A septum according to claim 1 wherein said at least one opening in said tubular air release shield is elevationally substantially coincident with said top openings in said tubular core member.

7. For use in a liquid filtration system having a filter tank, a plate separating said tank into an upper influent compartment and a lower filtrate compartment, a plurality of spaced apart vertically supported septums mounted in said influent compartment, and pre-coat means including means for distributing pre-coat particles on said septums, each said septum comprising:

a tubular core member having a top end and a bottom end, having a plurality of top openings therein immediately adjacent said top end, having a short axial length impervious portion adjacent and below said plurality of top openings and a perforated portion extending from said impervious portion downwardly to said bottom end;

a multi-layer filter screen positioned about the exterior of said tubular core;

a tubular air release shield positioned on said filter screen having a tubular sidewall with at least one opening therethrough, the sidewall extending from said tubular core member top towards said tubular core member bottom of a length sufficient to at least substantially encompass said tubular core member impervious portion; and an end fitting closing said top end of said tubular core whereby at least a substantial portion of gas entrapped in the septum is vented through said tubular core top openings and said air release shield at least one opening.

8. A septum for use in a liquid filtration system according to claim 7 wherein said multi-layer filter screen has a short axial length upper screen portion and a lower screen portion, the upper filter screen portion being formed of more open mesh material and the lower filter screen portion being formed by more closed mesh material.

9. A septum for use in a liquid filtration system according to claim 8 wherein a point of transition is established between said more open mesh material and said more closed mesh material, the point of transition being within said tubular air release shield.

10. A septum for use in a liquid filtration system according to claim 8 wherein said filter screen is formed of at least two layers having different meshes and wherein one screen has substantially the same mesh from said top to said bottom of said tubular core and another screen has a more open mesh in said upper screen portion and a more closed mesh in said lower screen portion.

11. A septum for use in a liquid filtration system according to claim 7 wherein said end fitting has a substantially inverted conical inner surface downwardly extending within said tubular core top end configured to cause any air trapped within said tubular core to move towards said top openings.

12. A septum for use in a liquid filtration system according to claim 7 wherein said at least one opening in said tubular air release shield is elevationally substantially coincident with said top openings in said tubular core member.

* * * * *